MARTIN S. FRANT
EUGENE G. ROCHOW, INVENTORS

BY Rines and Rines
ATTORNEYS though the present invention contemplates the
United States Patent Office 3,507,627
Patented Apr. 21, 1970

3,507,627
HEATING AND CATALYTIC CHEMICAL REACTION APPARATUS
Martin S. Frant, Newton, and Eugene G. Rochow, Winchester, Mass., assignors to Prototech Incorporated, Cambridge, Mass., a corporation of Massachusetts
Filed May 22, 1964, Ser. No. 369,428
Int. Cl. B01j 9/04; H05b 3/10; H01c 7/00
U.S. Cl. 23—288                                             9 Claims

ABSTRACT OF THE DISCLOSURE

This disclosure deals with a novel parallel tubular passage catalytic reactor having catalyst dispersed upon resistive conductive layers lining said passages and heated by electrical current passing therealong.

---

Figures 1, 2:
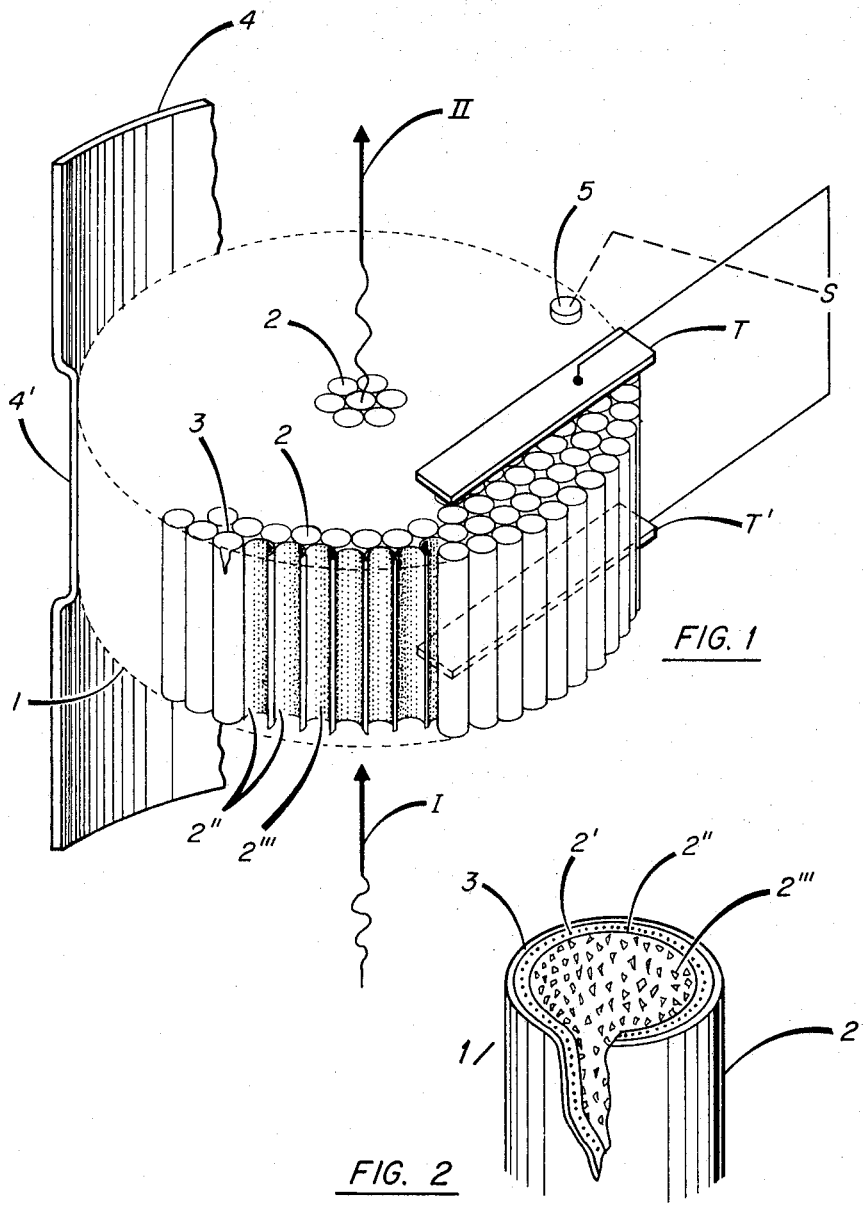

The present invention relates to heating apparatus, to catalytic chemical reaction apparatus and, more particularly, to apparatus for producing chemical reaction with materials carried along a fluid flow, including catalytic chemical reaction to remove impurities accompanying the flow of a fluid, such as a gas, vapor, or liquid, and actual synthesizing or otherwise effecting chemical changes by constituents or materials carried along the fluid flow, such as, for example, synthesis of sulfur trioxide from sulfur dioxide, or the like.

The feasibility of employing catalytic chemical reaction to remove impurities or to synthesize chemicals and the like has long been recognized and widely used. In general, such processes have required complicated apparatus for bringing the fluid to required temperatures for interaction with catalysts. For example, in the field of removing impurities by catalytic chemical reaction from fluid flows, such as removing noxious vapors in exhaust systems, it has been proposed to employ heated wires or other surfaces past which the fluid may flow, the wires or surfaces carrying a catalytic material that, at suitable temperature, will interact with the impurities and thus purify the fluid stream. There are, however, serious practical difficulties involved in apparatus of this character. As an example, attempts have been made to employ very fine resistance wires to provide a fine mesh through which the impure fluid may flow, the resistance wires carrying catalytic material. Unfortunately, however, in the heating of the resistance wire, the thin wires expand and contract and become mechanically deformed, resulting in spurious contacting of adjacent wires and other deleterious results. In addition, the problem of physically supporting a fine mesh of this character extending over sufficient areas or volumes crosswise to the fluid flow to provide effective catalytic reaction to the degree required has rendered such proposals largely impractical. Other suggestions such as the utilization of strips bent into zigzag and other configurations and carrying catalytic material have been found equally wanting because when they are constructed heavily enough for adequate mechanical support, they do not provide a very large surface area for enabling substantial catalytic chemical reaction. If, indeed, large diameter or large dimension wires or strips are employed, this reduces the available area of free flow for the fluid and results in deleterious pressure drops being produced. In connection with the above, it is pointed out that it is necessary for the fluid to contact substantial catalytic material that has been elevated to the required temperature, and the surfaces of the above described character do not provide adequate contact area for many applications.

An object of the present invention, accordingly, is to provide a new and improved apparatus for enabling catalytic chemical reaction with materials carried along the fluid flow that shall not be subject to any of the above described disadvantages but that, to the contrary, shall enable very effective large surface area contact between the fluid and the catalytic material consistent with the provision of minimal pressure drop and satisfactory mechanical support.

A further object is to provide a new and improved catalytic chemical reaction impurity remover.

Still an additional object is to provide a new and improved catalytic chemical reactor of more general applicability, including uses for synthesis and the like.

A further object is to provide a novel fluid flow heating apparatus.

Other and further objects will be explained hereinafter and will more particularly be pointed out in connection with the appended claims.

In summary, however, the invention contemplates the utilization of a cellular support, preferably of high-temperature electrically insulating material, comprising a plurality of juxtaposed substantially parallel tubular passages. In preferred operation, the passages are bounded by walls which are thin compared with the cross dimension of the passages, in order to permit fluid to flow substantially simultaneously through the passages with minimal pressure drop. The walls bounding the passages carry a resistive conductive layer that extends substantially continuously along the passages between the ends thereof, and catalytic material is deposited upon at least regions of these layers. Electric current is fed near the ends of the passages to the resistive conductive layers to heat the layers in response thereto, and thus to activate catalytic reaction between the materials carried by the fluid and the catalytic means. Constructional details and preferred embodiments are hereinafter set forth.

The invention will now be described in connection with the accompanying drawing, FIG. 1 of which is an isometric view with parts somewhat broken away to illustrate details, showing the invention in preferred form; and FIG. 2 is an enlarged fragmentary perspective of one of the tubular passages of cellular support of the invention of FIG. 1.

Referring to FIG. 1, fluid flow such as, for example, a gas carrying impurities to be removed, is shown effected in the direction of the arrows, entering from below, as shown at I, and emitting from above, as shown at II. Apparatus employing a cellular support 1, illustrated for purposes of example as a cylindrical disc, comprises a plurality of juxtaposed substantially parallel hollow tubular passages 2, bounded by walls that are thin compared with the cross-dimension of the passages 2, as illustrated. In preferred form, for reasons later explained, the walls of the support are preferably constituted of high-temperature electrically insulating material such as the rough, unglazed, porous ceramic materials marketed under the trademark "Cercor" by Corning Glass Works, Inc., and the corrugated ceramic similar material marketed by Minnesota Mining and Manufacturing Corporation. Other products of this type have been marketed by Du Pont, Norton Co. and others. Typical ceramic honeycomb-like cellular structures of this character have, for example, substantially triangular cross-section honeycomb-like cells (40 mils high and 75 mils wide at the base), cell wall thickness of the order of 5 mils, and a wall porosity of about 35 to 40 percent, providing a substantially 70 percent open-face area. The utilization of such thin-walled structures having such large open area for the passages enables the fluid to flow with minimal pressure drop.

It is this structure that has been found to provide excellent mechanical support for resistive conductive coatings or layers that are carried on the inside walls of the tubular passages 2. In view of the difficulty attendant in attempting to deposit such resistive conductive layers, it is important to explain how substantially continuous layers of resistive conductive material, such as nickel and the like, may be so deposited, and thus provide closely spaced heatable resistance passages having mechanical stability. It has been found, for example, that the immersion of such a support 1 in a surface-sensitizing solution comprising 70 grams/liter of stannous chloride and 40 grams/liter of hydrochloric acid causes the advantageous adherence to the cell walls of traces of such sensitizing material. These traces are shown more particularly in FIG. 2 by the dots 2'. After excess sensitizing material has been rinsed away, the support 1 is immersed in, for example, a solution consisting of 1 gram/liter of palladium chloride, containing 1 ml. of concentrated hydrochloric acid, in order to deposit metallic palladium as a further sensitizing element at each of the sites where the tin compound has been deposited for enabling subsequent adherence of the resistance conductor material to the walls of the support 1. As will be made evident in a moment, the palladium also serves as an initiator in a metallic deposit decomposition process subsequently employed to deposit resistive conductive material as a layer upon the walls of the cells 2. This metallic deposition may be effected by then immersing the support 1 in the following solution at 200° F.: nickel chloride 30 grams; sodium hypophosphite 10 grams; sodium citrate 10 grams; water to make one liter, at a pH of about 4 to 6. Immersion results in the deposition upon the sites of the traces of palladium sensitizer and then spreads to form a continuous layer or film shown at 2" between the upper and lower ends of the support 1. In such a process as above described, if the immersion is effected in the position shown at FIG. 1, the generation of hydrogen gas by the decomposition of the solution has been found advantageously to cause an upward circulation of new solution, insuring the deposition of successively thicker continuous layers of nickel to the desired degree.

The catalyst desired for the catalytic chemical reaction to be effected in this apparatus is then deposited upon the continuous resistive conductive nickel layer 2" by any desired standard technique such as, for example, electroplating platinum thereupon or the electroless deposition of palladium by the method of Rhoda described, for example, in U.S. Letters Patent No. 2,915,406. At the very least all that is required is the provision of regions of catalysts as shown at 2''' in FIG. 2.

By sending electric current along the resistance layers 2" between the upper and lower ends of the passages defining the upper and lower surfaces of the support 1, the resistive metal 2" may be heated to the desired degree for bringing the catalytic elements 2''' to the temperature necessary for reaction with materials carried by the fluid flow passing through the passages 2.

There is, however, a problem involved in trying to provide electric terminals for supplying current from a source S to the upper and lower end surfaces of the tubular passages 2 of the support 1 in a manner such as to establish satisfactory electrical connection with the array of continuous nickel or other resistance conductive layers 2", so that they all will be simultaneously heated by the passage of current from the source S. A satisfactory technique for establishing electrical connection is by flame-spraying a low resistance conductive coating 3, as of copper, silver or the like, to the upper and lower terminal regions or end surfaces of the tubular passages 2 of the support 1. This insures a uniform conductive surface across the upper and lower faces of the support 1 so that the current may be distributed by terminal strip T uniformly across the face and thus through each of the parallel conductive wall layers 2" to the opposite face and thence back by terminal strip T' to the current source S. To achieve this end, one might also apply the flame-sprayed end layers 3 prior to the metallizing of the nickel or other resistive conductive walls 2". Conductive screens have also been successfully brazed or spot-welded to the upper and lower surfaces of the support 1 for the purpose of distributing the current and establishing electrical contact with the resistive conductive wall layers 2" in each of the passages 2. A further method of achieving electrical contact with the conductive wall layers within the passages consists in applying a conducting paint widely used in the electronics industry, by spray, brush, or stamp-pad techniques, and then curing the paint as recommended by its manufacturer.

If the before-mentioned high temperature insulator, such as ceramic material, is used for the support 1, good heat retention is thereby provided which improves the efficiency of the device. The ceramic materials before described, moreover, have the property of having rough surfaces as well as being porous; these properties being advantageous in permitting strong adherence of the surface-sensitizer materials and in addition providing surface areas for the deposition of the resistive conductive layers that are greater than would be the case with a smooth surface. In addition, mechanical interlocking of the resistive nickel or other surface 2" is effected because of this rough and porous character of the preferred material. Furthermore, the rough and porous character of the support material provides a much greater surface area than would a smooth metallic tube, for example, and so enables the conductive layer and its catalytic material deposited thereon to occupy this additional area. Improved contact with the fluid and more efficient catalysis thereby result.

In order to provide for the most effective operation, the support 1 is preferably secured within a conduit or other passage that confines the fluid flow as shown at 4; the support being illustrated as held by the dimpled or recessed region 4'. This may, for example, assume the form of a conduit associated with ovens or cooking utensils and the like where the device is used to remove odors from a stream of air and vapor issuing from said device.

Whereas prior art catalytic reaction systems have attempted to effect controls by affecting the temperature of the fluid medium, a very convenient technique and more accurate control is provided by the present invention by monitoring the temperature of the resistance layers 2" and controlling the current fed from the source S in conventional manner in accordance with, for example, the measurement of the resistance of the layer 2" by a conventional sensor 5, schematically shown controlling the source S. Alternatively, bi-metal or other temperature sensing elements may be used in place of the element 5 as is well known to effect such maintenance of substantially constant temperature.

While nickel has been described as employed in connection with a preferred cell, other metals may also be used. As illustration, a cell of "Cercor" material, 1¼" in diameter and 1" thick, prepared as above described in connection with nickel 2" and a platinum catalyst 2''', heated to a temperature of the order of 365° centigrade, was found capable of eliminating all traces of acetic acid in an air stream. In other tests, a cell constructed in the manner above described, and employing silver as the catalytic agent at 2''', operating at 440° centigrade and having dimensions substantially 1¼" square and 1" thick, was found completely to remove all traces of smoke from air collected above burning vegetable fat.

Other resistance metals that may be used in different applications include chromium, iron, cobalt, palladium, platinum, and very thin silver and gold layers, as well as copper layers, and alloys of the same. Well known surface sensitizers that may be used may be salts, such as chlorides of elements selected from Groups I–B and IV (including IV–A and B, all hereinafter referred to as IV) of the Periodic Table and palladium and platinum. In connection with synthesizing operations in the manufacture of ammonia, iron-nickel alloys may be used as the catalyst 2'''; in the manufacture of nitric acid, platinum may be used as the catalyst; for sulfuric acid manufacture, vanadium or platinum will serve as a catalyst.

In some instances nickel or its oxide may also be employed as a catalytic layer itself.

Further modifications will occur to those skilled in the art and all such are considered to fall within the spirit and scope of the invention as defined in the appended claims.

What is claimed is:

1. Apparatus for producing catalytic chemical reaction with materials carried along a fluid flow, the apparatus having, in combination, a cellular support comprising a plurality of juxtaposed substantially parallel tubular passages having open cross-sectional areas substantially greater than that occupied by the walls bounding the passages for permitting fluid to flow simultaneously through the passages with minimal pressure drop, the walls bounding the said passages carrying resistive conductor layers extending substantially continuously along the passages between the ends thereof, catalytic means carried upon at least regions of said layers, and current-supply means connected with the resistive conductor layers of the passages for passing current along the length of said passages and heating the layers in response to said current, said current-supply means comprising conductors connected uniformly along the length of all of said passages to heat said catalytic means to a temperature adapted to provide substantial catalytic reaction with said materials.

2. Apparatus as claimed in claim 1 and in which the cellular support is constituted of a high-temperature insulator.

3. Apparatus as claimed in claim 1 and in which the cellular support is constituted of a roughened high-temperature insulator.

4. Apparatus as claimed in claim 1 and in which the cellular support is constituted of a porous high-temperature insulator.

5. Apparatus as claimed in claim 1 and in which the cellular support is constituted of a ceramic insulator.

6. Apparatus as claimed in claim 1 and in which conduit means is provided for confining the fluid flow substantially to the cross-section of the support and having means for securing the support within the conduit means.

7. Apparatus as claimed in claim 1 and in which means is provided for controlling the said current to maintain the temperature of the catalytic means substantially constant.

8. Apparatus as claimed in claim 1 and in which the resistive conductive layer is bonded to a surface sensitizer material adhered to the said support walls.

9. Apparatus as claimed in claim 8 and in which the resistive conductive layer is selected from the group consisting of iron, nickel, very thin silver, copper, and gold layers, and alloys of the same, and the sensitizer matrial is selected from the group consisting of chlorides of one of the elements of Group I-B and IV of the Periodic Table and palladium and platinum.

References Cited
UNITED STATES PATENTS

| | | | |
|---|---|---|---|
| 3,109,715 | 11/1963 | Johnson et al. | 23—288 |
| 3,163,841 | 12/1964 | Willett | 338—308 X |
| 3,172,251 | 3/1965 | Johnson. | |
| 3,206,332 | 9/1965 | Juda | 136—86 |
| 3,206,334 | 9/1965 | Ehrenfeld | 23—288 X |
| 3,211,534 | 10/1965 | Ridgway. | |
| 3,228,797 | 1/1966 | Brown et al. | 136—86 |
| 3,235,473 | 2/1966 | Le Duc. | |

JOSEPH SCOVRONEK, Primary Examiner

U.S. Cl. X.R.

117—229; 219—307, 376; 252—477; 338—308